(12) United States Patent
Jackson et al.

(10) Patent No.: US 7,740,953 B2
(45) Date of Patent: Jun. 22, 2010

(54) SKIN SYSTEM WITH ELASTIC COMPONENTS HAVING DIFFERING HARDNESSES FOR USE WITH ROBOTICS

(75) Inventors: Philip John Jackson, Glendale, CA (US); Bryan S. Tye, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 87 days.

(21) Appl. No.: 12/029,827

(22) Filed: Feb. 12, 2008

(65) Prior Publication Data

US 2009/0202854 A1      Aug. 13, 2009

(51) Int. Cl.
*B32B 1/00* (2006.01)
(52) U.S. Cl. .................. 428/542.8; 700/245; 700/253; 700/258; 521/79; 446/337; 446/341; 446/342; 446/392
(58) Field of Classification Search ................. 428/212; 338/47, 99, 114; 700/245, 253, 258; 521/79; 446/268, 337; 74/469
See application file for complete search history.

(56) References Cited

U.S. PATENT DOCUMENTS

| 4,481,001 A | * | 11/1984 | Graham et al. ............ 434/267 |
| 4,694,231 A | | 9/1987 | Alvite' |
| 6,568,941 B1 | * | 5/2003 | Goldstein ................... 434/267 |
| 6,905,390 B2 | * | 6/2005 | Fukui et al. ................ 446/337 |
| 7,113,848 B2 | * | 9/2006 | Hanson ...................... 700/245 |
| 7,310,571 B2 | | 12/2007 | Kumazawa et al. |
| 2003/0110540 A1 | | 6/2003 | Fukui et al. |

* cited by examiner

*Primary Examiner*—David R Sample
*Assistant Examiner*—Tahseen Khan
(74) *Attorney, Agent, or Firm*—Marsh Fischmann & Breyfogle LLP; Kent A. Lembke

(57) ABSTRACT

An artificial skin system for use with a robotic assembly such as to provide an animated robot head with realistic skin movement. The skin system includes a receiving component for contacting the manipulator mechanism of the robotic assembly and also includes an exterior skin component that extends over the receiving component. An inner surface of the exterior skin component is integrally bonded to the receiving component such that the exterior skin component moves with the receiving component when a manipulator mechanism or robotics anchored to the receiving component moves or applies a force. The exterior skin component is formed of an elastic material with a second hardness that differs from a first hardness of elastic material of the receiving component, e.g., is less than the first hardness. The skin system includes a backing component bonded to the other components with a third hardness less than the first and second hardnesses.

20 Claims, 6 Drawing Sheets

SKIN SYSTEM WITH ELASTIC COMPONENTS HAVING DIFFERING HARDNESSES FOR USE WITH ROBOTICS

BACKGROUND OF THE INVENTION

1. Field of the Invention

The present invention relates, in general, to creating realistic skin for robots or for use with robotics or other applications in which skin or similar coverings are applied (e.g., robotics used to simulate movement of a human's or a character's face, hands, or the like), and, more particularly, to skin assemblies and methods for providing skin over robotics that are effective for producing realistic or desired movement in response to applied mechanical forces such as may be applied by an actuator or mechanical driver in a robotics system to create facial animation.

2. Relevant Background

Robotics involves the design and use of robots such as to provide programmable actuators or drivers to perform tasks without human intervention. Many advances in robotics were produced due to the demand for robots to perform manipulation tasks in manufacturing such as the automobile, steel, and other industries. More recently, however, there have been significant demand for robotic devices (or robots as these terms may be used interchangeably in this document) that simulate human, animal, and other living beings. These robotic beings are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech). Robotics may be used also to show emotion by providing particular facial movements including eye movement such as frowning, smiling, and the like.

While many advances have been made in realistically simulating the physical movement and facial movement of a character, problems persist with maintaining a realistic or desired movement or facial animation occur when the robotics (e.g., internal components of a robot including mechanical/structural portions as well as software, hardware, power systems, and the like) are covered. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or any other fanciful covering system such as a metallic suit or any other desired covering. In simulating humans, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The connection or anchoring points often will become apparent as the skin is pulled or pushed from behind. Additionally, the movement may be undesirably localized with movement only at the appoint of attachment, whereas a human face generally stretches and contracts more as a unit (or the movement is more widespread across the face), e.g., a human's skin around their nose and eyes may move when skin around the mouth moves while a robotic skin may only move near the manipulating robotics.

Efforts have been made to try to create a material for use as the skin for robotics, and especially for a facial skin for human-like robots, but most of these materials still only provide a layer of skin that has a tendency to move at the point of attachment. Other work has been directed to changing how the skin is attached such as by providing multiple contact points to cause two or more areas to be manipulated concurrently, but these systems require more complex robotic actuators or drivers and, often, more complex programming.

Currently, a skin for a robotic animation system is made using a manual process relying on skill and experience of the craftsperson creating the skin. A sculpture is created, such as from clay, that represents the exterior skin shape (e.g., a person's face). The sculpture is molded, and then a sheet wax or layer of clay is laid by hand into this exterior mold to define a desired thickness for the skin. An interior core is then fabricated by hand such as by using fiberglass and resin, and this core may be configured to include skin attachment points to allow robotics to later be attached or anchored to the skin. A fiberglass or similar material is used to form a mold from this core, and hard shells, e.g., fiberglass shells, to support the skin, when the robot is later assembled, are then created from this core mold. A skin is formed by pouring a rubber or other flexible material into the gap between the exterior mold (with the sheet wax removed) and the core mold. After it is set, the skin is then removed from the molds and placed on the supporting shell(s) and attached to portions of the robotics. Skin fabrication has been a cumbersome process and animation (or transfer of mechanical forces applied by the robotics) has often not met the needs of the robotics industry as the unitary skin reacts to the attached robotics in undesirable ways, which may include exposing the underlying robotics, moving only or mainly at the attachment point, and durability of skin at mounting or contact locations with the robotics.

Hence, there remains a need for improved methods for covering robotics to provide more realistic and/or desirable transfer of mechanical forces to the covering, e.g., to provide more realistic skin that can be attached to the drivers, actuators, manipulators, and the like of the robotics such as to improve facial animation.

SUMMARY OF THE INVENTION

The present invention addresses the above problems by providing an artificial skin system (e.g., an artificial texturing or covering system) that is formed from two or more layers or components that each may be formed of a differing material or composition of the same material (e.g., an elastomer) to provide differing hardnesses. The skin systems described herein are particularly well suited for use as skin for use with robotics such as that may be used to produce a robot head with realistic facial movement or animation but may, of course, be used in nearly any application in which a skin or covering is placed over a rigid or dynamic/movable support structure, frame, or the like. The skin systems are formed in a manner that produces a single, integral unit in which the components are bonded to each other to move together when manipulated by the attached or contacting robotics. The skin system may include a flexible mechanism insertion section that transmits and distributes forces from a robotic mechanism. The forces or movement are transmitted to an adjacent backing member or component and to an overlying exterior layer or component (e.g., the outer visible skin layer that may be sculpted with facial features of a modeled character). The flexible mechanism insertion section typically is harder than the flexible exterior layer as this may cause the exterior skin to move in a desired manner (e.g., more realistically relative to a natural creature) such as less mechanical while also making the section that contacts the robotics more durable.

The soft flexible backing component supports a substantial portion of the exterior skin and more uniformly distributes forces and stresses that occur during movement of the flexible mechanism insertion section, which may be surrounded by the backing component (e.g., the insertion section may be used to simulate a mouth of a creature while the backing is used to simulate the lower layers of skin, muscle, and the like under the exterior layer). The backing component is formed in some embodiments of a material that may be considered too soft and elastic to be used as the exterior skin but is effective and durable when encapsulated between the flexible exterior skin and a rigid supporting shell that is used to support and house the robotics. The backing component may be attached to the flexible mechanism insertion section such as with adhesive. A unitary skin system is formed by pouring the exterior skin layer or component over the other skin system components (e.g., pouring a fluid resin of elastomer material such as silicone into a mold containing the rigid shell, the attached soft backing component, and the insertion section bonded to the backing component). In other embodiments, only two components with differing hardnesses are used in the skin system, and in other embodiments, the skin system includes four or more components with at least two hardness values.

More particularly, an artificial skin system is provided for use with robotics or a robotic assembly such as to provide an animated, robot head with realistic skin movement in response to mechanical robotic manipulation. The skin system includes a force receiving component with a receiver for contacting the manipulator mechanism of the robotic assembly. The force receiving component is formed for an elastic material with a first hardness. The skin system also includes an exterior skin component that extends over some or, more typically, all of the force receiving component. An inner surface of the exterior skin component is destructively or integrally bonded to the force receiving component such that the exterior skin component moves with the force receiving component when the contacting manipulator mechanism moves or applies a force. The exterior skin component is formed of an elastic material with a second hardness that differs from the first hardness, e.g., is less than the first hardness such as when the first hardness is less than about 60 while the second hardness is less than about 50 as measured with a durometer on the "00" scale. In one embodiment, the elastomer chosen for one or both of the components is a silicone. The skin system may further include an elastic backing component positioned adjacent to the force receiving component so as to transfer force from the force receiving component to the exterior skin component. The elastic backing component is bonded to the inner surface of the exterior skin component and has a third hardness less than the first and second hardness values. The elastic backing component may be attached to the force receiving component with an adhesive layer and the exterior skin component may be fabricated by pouring a fluid elastomer over the other components, which also integrally bonds the components together as the fluid elastomer hardens or solidifies.

According to another aspect of the invention, a method is provided for fabricating a multi-hardness skin system. The method includes molding a backing component with an outer surface with a predefined topology using an elastic material with a first hardness (e.g., a silicone with a hardness of less than about 25 as measured with a durometer on the "00" scale). A mold is provided for an exterior component with an exterior surface having a portion substantially similar in topology to the predefined topology of the outer surface of the backing component. Then, the method includes positioning the backing component within the exterior component mold and pouring a fluid resin of an elastic material into the exterior component mold. The fluid resin is allowed to harden or solidify to form the exterior component. This exterior skin layer has an inner surface (e.g., opposite the portion with similar topology to that of the backing component) that is bonded to the outer surface of the backing component. The exterior component has a second hardness that is greater than the first hardness. The method may further include molding a force receiving component from an elastic material with a third hardness greater than the first and second hardnesses and attaching the force receiving component to the backing component prior to the positioning of the backing component within the exterior component mold. The backing component may include an opening for receiving the force receiving component (e.g., a gap that may be about where a mouth would be in a face), such that the backing component extends about the periphery of the force receiving component. The method may also include mounting the backing component onto a rigid shell prior to the positioning of the backing component within the exterior component mold such that the exterior component extends over the backing component and at least partially over the rigid shell.

DETAILED DESCRIPTION OF THE PREFERRED EMBODIMENTS

Figure 1:
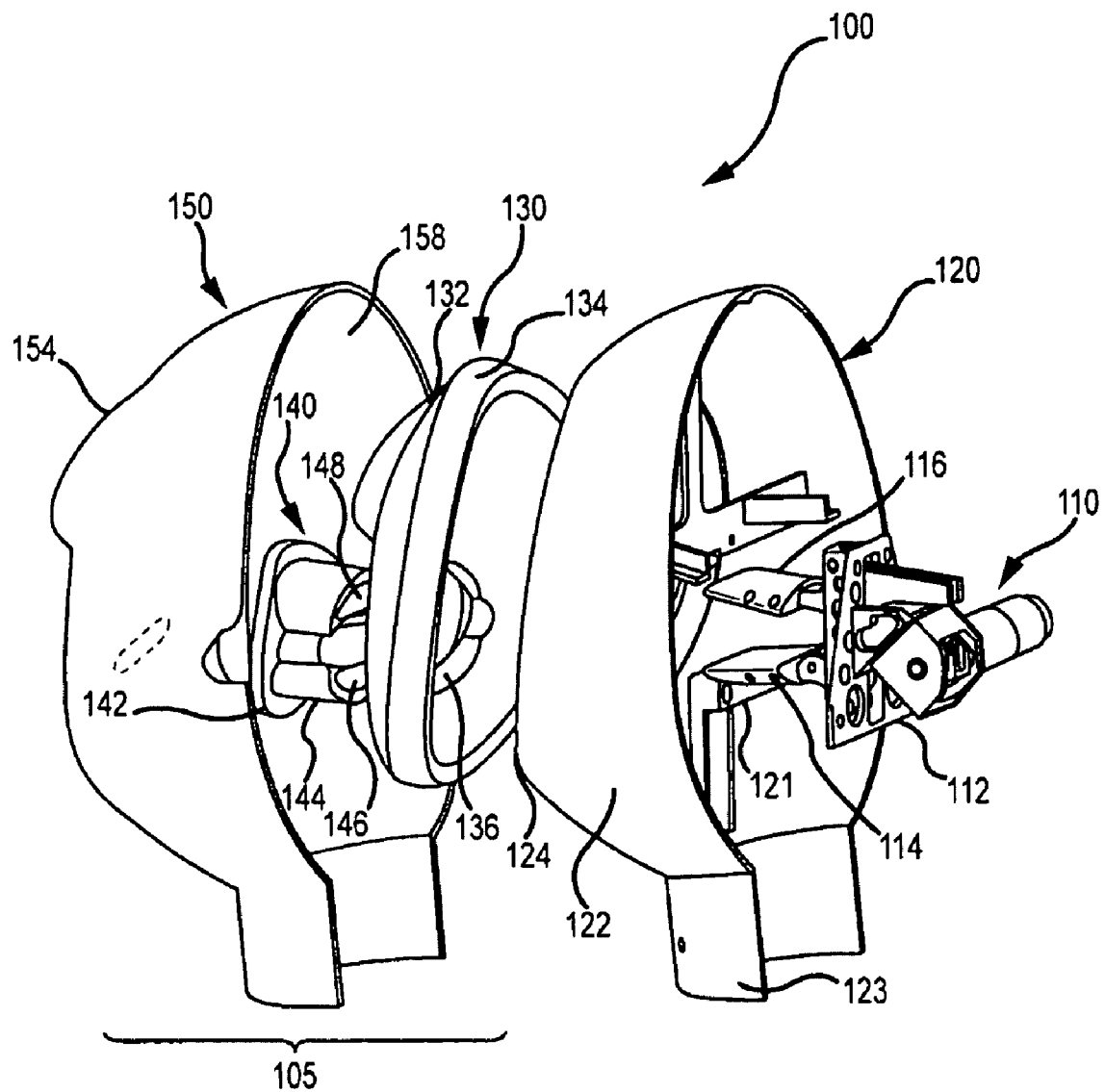
FIG. 1 is an exploded side view of a robot head with a skin system according to an embodiment of the invention with flexible components with differing hardness.

Briefly, embodiments of the present invention are directed to fabrication methods and skin systems (and robots or other structures/assemblies incorporating such skin systems) for providing extremely realistic looking facial movement or animation or providing a desired multi-hardness covering. In some embodiments, a skin system is provided that is durable and easily maintained and that is designed to simulate a face of a robot such as human face, a character face (e.g., a puppet face, an animated creature face, or the like), a creature face, or the like. The skin system is typically fabricated from two or more flexible components with differing physical characteristics such as two or more components or layers formed from the same or differing materials but having two or more hardnesses to achieve a desired effect. The following highlights the use of such a skin system with robotic assemblies, but the skin system is also useful in other applications in which it is desirable to cover a still/rigid or a dynamic/movable frame, support structure/skeleton, or other object with a skin system having more than one hardness (or more than one durability/flexibility). Such other applications are considered within the breadth of the following description and claims.

For example, a component may be included in the skin system for receiving mechanical forces (e.g., force receiving component) or this component may be thought of as the anchor component or the manipulated component as it typically is adapted for mating with driving or manipulation members of a robotics system (e.g., mouth driving mechanism of robotics system may be attached to this member). Since this component needs to resist wear and transfer forces, it may be formed of a flexible material with a relatively high hardness. Other components in the skin system contact this force receiving component such as an intermediate support component and an overlying or exterior component or layer that extends over all other components. These components may be formed of a flexible material but with a relatively low hardness.

The overlying or exterior component may further act to bond all the components of the skin system together into a single unit. The skin system may be supported by structural members such as an inner shell or frame formed of rigid materials (such as plastic or fiberglass) to simulate rigid support found in nature such as a skull or other bone. The robotics may be housed within this support shell and extend through the shell to engage the skin system, e.g., the force receiving component, to manipulate the skin system to create desired animation such as facial expressions or speech. The use of multiple hardnesses for the joined skin components in the skin system results in more realistic movement of the skin such as less obvious point source pushing and pulling where the robotics engage the skin system and such as skin distal to the contact points moving in unison (e.g., the skin system better simulates human and other skin in that it moves more as a unit rather than in small isolated patches where a force is being applied).

Figure 2:
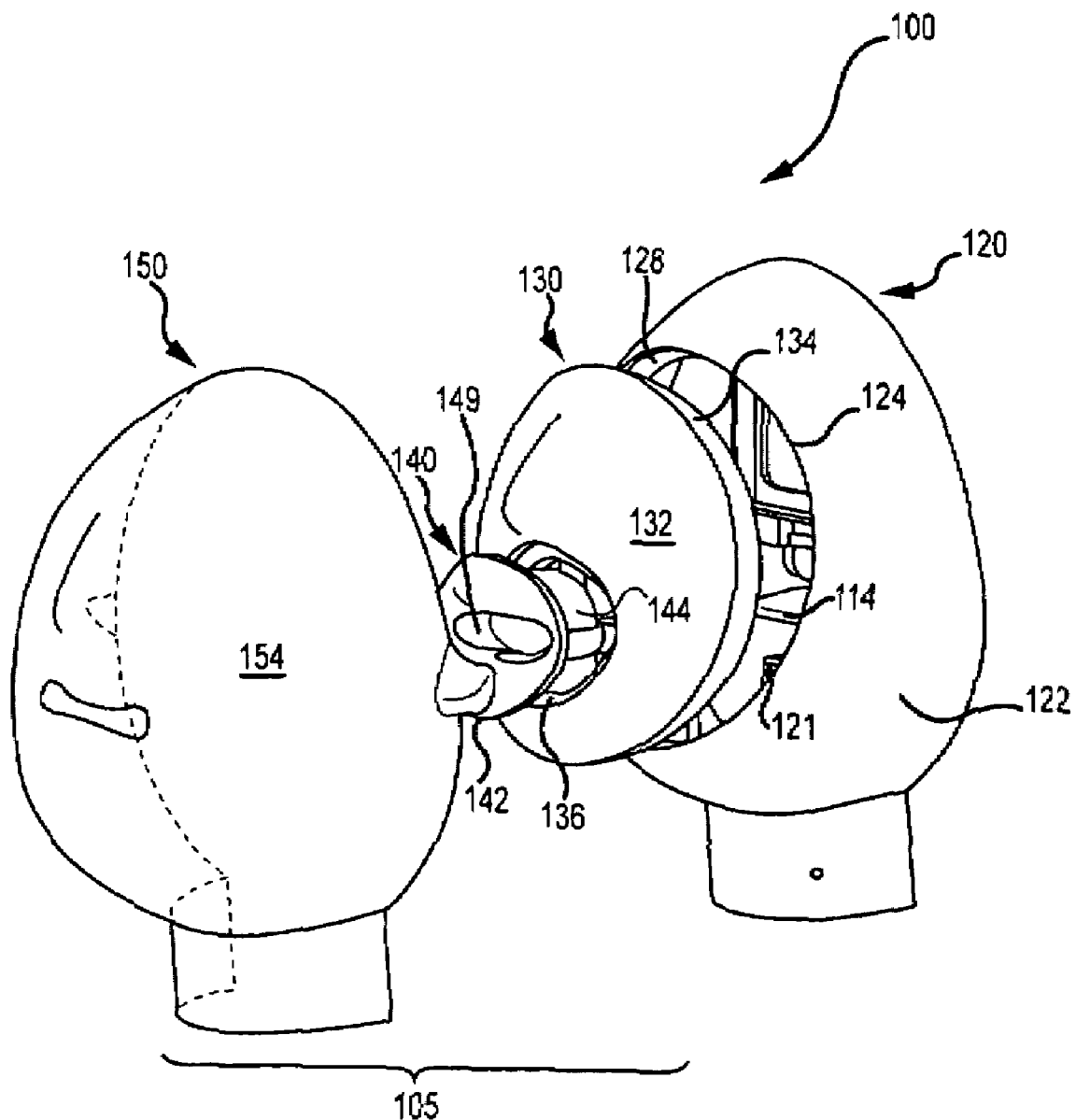
FIG. 2 illustrates a side view similar to that of FIG. 1 showing more detail of the mating of the flexible components of the skin system and placement within a receiving opening or surface of a supportive shell or frame.

FIGS. 1 and 2 illustrate an embodiment of a robot head or robotic assembly 100 that includes a robotic assembly 110, a hard shell or structural support frame 120, and a skin system 105. The robotic assembly or robotics 110 is shown in simplified form and may include typical robotic software, hardware, and mechanical mechanisms and linkages used to perform programmed or controllable movements. In this regard, the robotics 110 includes a mounting plate 112 for attaching it to structural frame 120 upon mounting member 121. The robotics 110 in this example may be a mouth mechanism or mechanism for simulating movements of a mouth, and, as such, includes manipulators or skin driving members 114, 116 (e.g., upper and lower jaw or roof of mouth and bottom of mouth simulating elements extending from driving devices in robotics 110). The particular arrangement and configuration of the robotics 110 is not limiting to the invention as the skin systems of the invention, such as system 105, may be used with numerous robotics or other devices that impart force to provide a desired response (or look and feel). As shown, the robotics 110 is enclosed in the shell 120, and, typically, the robotics 110 are inserted into the shell 120 before or after the pouring of the exterior layer or component 150 of the skin system 105.

A hard shell or support frame 120 is included in the robot head 100 to provide the structure of the head and to provide physical support for the soft skin system 105 and to contain and hide the robotics 110. The hard shell 120 is rigid and is typically formed of a material such as a plastic (such as a polycarbonate/ABS mix or the like) but metals and alloys may also be used to form shell 120. The shell 120 includes a sidewall 122 generally in the shape of the head (or skull) of the creature being simulated by robot head 100, with the head 100 being a relatively generic character such as may be used to imitate a puppet or character such as for use in an amusement park. The sidewall 122 extends down into a neck portion 123 of the shell 120. The shell 120 functions to support the skin system 105, and, in this regard, the sidewall 122 includes an opening 124 for receiving a component 130 of the skin system 105. Specifically, a receiving surface 128 extends from the sidewall 122 at the gap or opening 124 to receive the component 130, and this surface 128 may be tapered to guide the component 130 into the shell 120 but block or limit travel (e.g., to cause the component 130 to be substantially flush with the outer surface of the sidewall 122). Component 130 may also be bonded to shell 120 at surfaces 128 and 134 to seal cracks or seams that may allow later poured material such as liquid silicone to leak through to the interior of the shell 120.

Significantly, the skin system 105 includes two or more portions or layers that have differing hardness. These portions may be formed from the same or differing materials, and in some embodiments are bonded together to move as if formed as an integral part. As shown, the skin assembly 105 is formed from three components 130, 140, 150, but, in other cases, fewer or more components may be utilized. Further, all of the components may have differing hardness values or some of the parts may have the same or similar hardness values with the important aspect being that at least two of the components have different hardness values.

In the illustrated example, the skin system 105 includes three components or layers 130, 140, 150. The first component is a soft, flexible backing component or layer 130. The soft flexible backing component 130 is used in the robot head 100 as a thick, soft layer that is positioned behind the exterior component or layer 150, which is formed with details (such as facial details to simulate a particular character, human, or creature) to provide the head 100 with a desired external or visible appearance. The backing component 130 may be the softest portion of the skin system 105, but this is not required as some configurations may be arranged such as the backing is one of the more hard portions. In some cases, though, the use of a backing component 130 that is relatively soft provides a more desirable effect because its softness allows it to be effective to support the exterior component or layer 150 while also allowing it to move relatively easily with adjacent components such as component 140, which is attached to the robotics 110 via member 114, 116.

For example, if the robot head 100 is being used to imitate a puppet with a soft foam head it may be useful for the whole face to move when the mouth moves, and this is achieved in the head 100 because the soft backing component 130 moves relatively freely with the force receiving component 140 (or the mouth) and this causes the supported portions of the exterior component (or the detailed "face" of the robot 100) to also move because, in part, the component 150 is bonded to the outer surface 132 of component 130 as explained below (e.g., due to pouring or forming the exterior component 150 upon the component 130).

The soft flexible backing 130 may be created with a mold and pouring a variety of materials into that mold to form its shape or casting the part, and the materials are generally elastic materials but this is not required to practice the invention as it may be useful to provide a more rigid component with one or more components that are rigid. However, typically the components of the skin system 105 will be elastic and flexible to allow manipulation by robotics 110. The materials used for the components 130, 140, 150 are chosen to be compatible to bonding such as bonding of component 130 to 140 with adhesive and then bonding of components 130 and 140 to component 150 during the molding and pouring processes. The materials may be the same or differ for the components 130, 140, 150, with some embodiments choosing the same material but differing hardnesses for the three components 130, 140, 150. The material may be a plastic or, more typically a polyurethane or rubber. In some embodiments, the component 130 is formed of silicone such as a silicone foam or a silicone foam with additives such as a silicone and urethane foam. As noted above, the backing component 130 is typically bonded to shell 120 about its periphery such as at surfaces 128 and 134 with adhesive or the like such that when the outer layer or component 150 is formed through pouring liquid does not seep into the interior of the shell 120.

As discussed, it is desirable to have the components have differing hardnesses to achieve desired wear and desired movements. Hardness herein is intended to relate in part to flexibility or level of elasticity with components 130, 140, 150 having a higher value of hardness being less elastic (and vice versa). Hardness is generally the resistance of a material to localized deformation and may apply to deformation from indentation, scratching, cutting, or bending. For elastomers, rubbers, and some polymers (that may be used for components in skin system 105), hardness may be thought of as the resistance to elastic deformation of the surface. A number of hardness tests may be used to establish the hardness values of the components 130, 140, 150, and the particular test or hardness scale applied is not limiting to the invention. For example, the durometer hardness test may be used, with a durometer being an instrument that is commonly used for measuring the indentation hardness of rubbers, elastomers, and soft plastics/polymers (such as polyolefin, fluoropolymer, vinyl, and the like that may be used in skin system 105). In one embodiment, the component 130 is chosen to be have the lowest hardness value of the three components 130, 140, 150 of system 105, and may have a hardness on a "00" scale as measured with a durometer that is less than about 40 with some embodiments using silicone, urethane, or the like that has a hardness on a "00" scale measured with a durometer in the range of about 1 to 25 (such as about 20 which is softer or more susceptible to elastic deformation than the rubber in a typical rubber band and some cases using a hardness of 5 or less on the "00" scale such as a hardness of about 3).

The component 130 includes a mating surface 134, which may be beveled as shown, that abuts or contacts the receiving surface 128 of the shell sidewall 122. As shown, the softer backing component 130 acts as the interacting portion of the skin system 105 with the shell 120, but this is not required to practice the invention (e.g., a harder component such as component 140 may abut the shell 120). The component 130 acts as a backing or support for the exterior component or shell 150, and, as such, it may be configured with a face or outer surface 132 that has similar contours and/or topography as the layer 150. In this way, the facing surface 132 may better support shaped surfaces of the layer 150 such as the nose shown on facing surface 132 and exterior surface 154 of layer 150. Also, as shown, the component 130 includes a gap or hole 136 for receiving and mating with the component 140 but in some embodiments the components 130 may not encircle the component 140 (e.g., may simply be placed adjacent an edge of the component 140). In this case, the component 140 is acting as the mouth of the head 100 and component 130 is acting as lower surfaces or layers of a face (e.g., the muscles, tendons, bones, and the like under the face adjacent the mouth), and, in this case, it is desirable to have the soft component 130 surround the sides of component 140 to have the surrounding portion of the face move with the mouth of the robot head 100.

Component 140 of the skin system 105 is typically the hardest component as it functions to receive the manipulators 114, 116 of the robotics 110. In other words, the component 140 is the force receiving/transmitting portion of the skin system 105 and preferably is a higher hardness value to have better wear characteristics and also to more effectively transfer the transmitted movement from the robotics 110 with less absorption of this force as would be the case with a very elastic or soft material (e.g., the component 130). In other embodiment, several portions of the skin system 105 may be provided to contact and interact with the robotics 110 (e.g., a plurality of anchor locations for the robotics) such as may be provided on a face at or near eyebrows or other locations to simulate separate facial muscles. The illustrated force receiving component 140 includes a front wall 142 that abuts and supports a portion of the exterior layer or component 150 (e.g., the lips in this case) and a receiver portion 144 with channels 146, 148 for receiving manipulators 114, 116.

During operation of the head 100, the robotics 110 move in a programmed or controllable manner that, in turn, causes the component 140 to move, and, particularly, a gap or void space 149 is provided to facilitate movement of the receiver 144 to open and close the void space 149 (e.g., to open and close the mouth of the head 100). Of course, the gap 149 is not required to practice the invention and its inclusion and shape, size, and other features may vary to practice the invention (e.g., to suit the desired action and appearance of the head 100 and the exterior layer 150 and its features). Note, though, that recessed surfaces in the components 130 and 140 act to receive poured liquid material used to form the exterior component 150 and assist in shaping the component 150 and also providing bonding sites between the components with depth which may provide better/stronger bonding.

Again, the component 140 may be made of the same material as the component 130 or of a differing material such as the elastic materials listed earlier. Typically, it is preferable that the materials used be selected to bond to the exterior component 150 when it is formed to provide a bond that generally extends over the entire exposed surfaces (e.g., over facing element 142, into void 149, and over outer or face surface 132) of these components 130, 140 upon formation of component 150. The flexible mechanism insertion section or component 140 is used to transfer mouth mechanism 110 movement smoothly into the face 150 (and component 130). It is also preferable to have an elasticity and toughness that makes it durable enough to withstand the repetitive movement of the mechanism or robotics 110 while being soft enough to maintain or provide a realistic action and/or look when it moves with the robotics 110. As with component 130, component 140 may be made in any of a number of well-known methods such as making a mold of the desired shape to allow pouring to cast or produce the component 140. The material may be chosen from those listed for the component 130 such as a silicone, a urethane, a rubber, or even some plastics. The hardness of the component 140, though, is typically greater than the adjoining component 130, and in some embodiments, such as a hardness between 30 to 90 as measured by a durometer on the "00" scale or a greater hardness such as up to 85 as measured by a Model D Durometer (or on the "D" scale) or even more (as may have to be measured on the Rockwell R scale). In one embodiment, the hardness of the component 140 is in the range of 40 to 60 on the "00" scale (e.g., about 40 to 45 measured hardness) with a value of between 45 to 55 being useful in some cases (e.g., about 48 was used in one implementation of skin system 105).

In the skin system 105 of FIGS. 1 and 2, an exterior layer or component 150 is provided that functions as the exterior skin layer of the head 100 (e.g., the portion that is visible to observers). The exterior layer 150 may be formed last by pouring or forming over the other components 130, 140 of the skin system 105 as well as the shell 120. The exterior component 150 includes an outer surface 154 that provides, in the head example, facial features of the robot head 100 such as lips, a nose, ears, and the like. The component 150 also includes an inner surface 158 that contacts and bonds at least to the other skin components 130, 140 and, in some embodiments, to the shell 120 (although bonding to the shell 120 is not required to practice the invention as the layer 150 typically extends about the entire shell 120 and connection only in the front or face portion is acceptable in many applications). The exterior component or layer 150 has a thickness that typically will be relative small such as less than 0.25 inches and more typically less than about 0.125 inches, but it may have a range of thickness to provide topology or features (such as ears, lips, and the like). In thinner portions or regions, the layer 150 relies upon the backing 130 and component 140, at least in part, to support and/or provide its shape.

The exterior layer 150 is typically fabricated by a final pour after assembly of the other components of the head 100. This technique of pouring the skin or exterior layer 150 last allows the details of an original sculpt (that is used for an exterior mold) to be picked up or created in the layer 150. For example, a molding process may be followed in which fluid resin (e.g., a thermosetting, thermosetting, thermoplastic, or other resin with additives provided to cause the resin to solidify) is poured into a mold or frame into which other skin components 130 and 140 have been placed. Concurrently, the pouring of the skin layer 150 causes the skin system 105 to become intrinsically bonded together (such as a crosslink or other bond between the materials of the differing components) such that the three components 130, 140, and 150 as well as shell 120 (which may be attached to the periphery of component 130) are attached to each other to behave as an integral unit or system (e.g., the layer 150 is bonded to the component 130 and also to the component 140 during the final mold process).

The layer 150 may be formed of any of the elastic materials discussed thus far and may be the same or a different material as one or both of the components 130, 140. In one embodiment, the exterior skin layer 150 is chosen to have a desired color and/or texture (e.g., of the character or being that is simulated by head 100) and may be formed of silicone or another elastic material such as rubber, urethane, plastic, or the like. The hardness is typically chosen to be less than the force transmitting Component 140 but greater than the soft and very elastic backing component 130. For example, the exterior skin layer 150 may have hardness value of less than about 50 on the "00" scale when tested with a durometer or more typically less than about 40 (such as between 30 and 40 with a hardness of about 36 used for the skin layer 150 in one implementation of a puppet head 100 and a hardness of about 30 to 32 used in another case). In one embodiment, a backing plate (not shown in FIG. 5) was provided within the interior of the shell 120 during the pouring/formation of layer 150 to support the soft, flexible backing component 130. In this embodiment, the backing plate acts as support in the final pour of the component 150, e.g., pouring of silicone or the like. The mold builds up pressure from the poured material of the component 150 as the silicone or other poured material is forced through the mold, and the backing plate keeps the component 130 from collapsing inward (e.g., generally in its final position as shown in FIGS. 4 and 5).

An important aspect of the invention is the use of two or more components with differing hardness (and, hence, elasticity and response to applied forces) within an integral skin system or assembly. In the example of FIGS. 1 and 2, three components 130, 140, 150 each having a differing hardness are utilized in skin system 105. These components may be formed of differing materials, be formed using molds formed for that part or by other fabrication processes, and be supported with a hard, rigid shell 120 or used in an application without such support. Further, the assembly process may vary to provide the system 105 and a robot head or other higher level assembly utilizing the skin 105, such as head 100 of FIGS. 1 and 2. However, the following description provides a useful assembly process that may be used to form skin system 105 and head 100.

Figure 3:
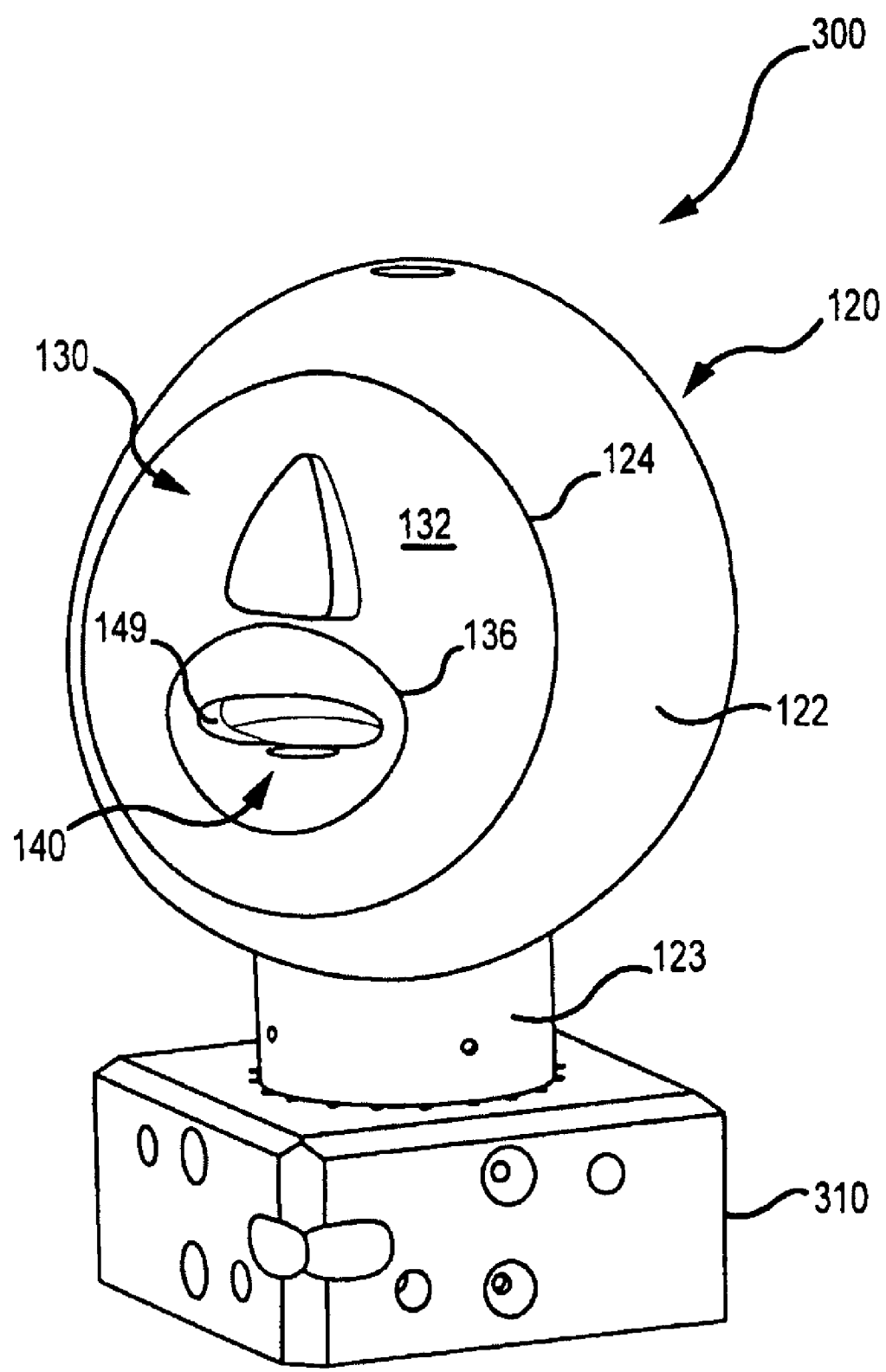
FIG. 3 is a perspective view of a robot head assembly during fabrication, e.g., prior to formation of the exterior component or layer of the skin system.

FIG. 3 illustrates a partial or fabrication assembly 300 of the head 100. As shown, the hard shell 120, the soft backing component 130, and the force receiving/robotic interaction component 140 have been formed and are being assembled into assembly 300. The shell 120 may be attached at the neck section 123 to block or mounting structure 310, which can function to physically support the assembly 300 during assembly and also to place the assembly 300 within a mold for pouring of the exterior layer or skin component 150. During assembly, the hard shell 120 is bonded to the soft flexible backing 130 using an adhesive to mate surface 134 to sidewall 122 receiving surface 128 (shown in FIGS. 1 and 2). Similarly, the backing component 130 is attached to the force receiving component 140 (e.g., flexible mechanism insertion section) using an adhesive. The adhesive may be any sealant appropriate to substantially permanently attach the components together (e.g., such that one or both of the parts have to be destroyed or damaged to disassemble or some lesser bonding amount may be useful in some cases) and that is selected for the particular materials used for these components of the assembly 300. In this way, the components 130 and 140 are physically supported by the shell 120 and component 140 is able to move in response to robotics 110 while transmitting forces to soft backing component 130. In one embodiment, the adhesive is a sealant used with silicone (or molded liquid silicone rubber) such as an RTV silicone adhesive sealant (one part acetoxy cure silicones, oxime-cure silicones, or otherwise) distributed by Dow Corning such as their 732 Multi-Purpose Sealant or the like. Of course, other adhesives may be used such as a polyurethane adhesive, an epoxy-based adhesive, a rubber adhesive (pressure or the like), a cyanoacrylate, an acrylic (light cure, two-part, or the like), and/or other adhesives that function to affix or destructively bond the components 120, 130, and 140 together in assembly 300.

Figure 4:
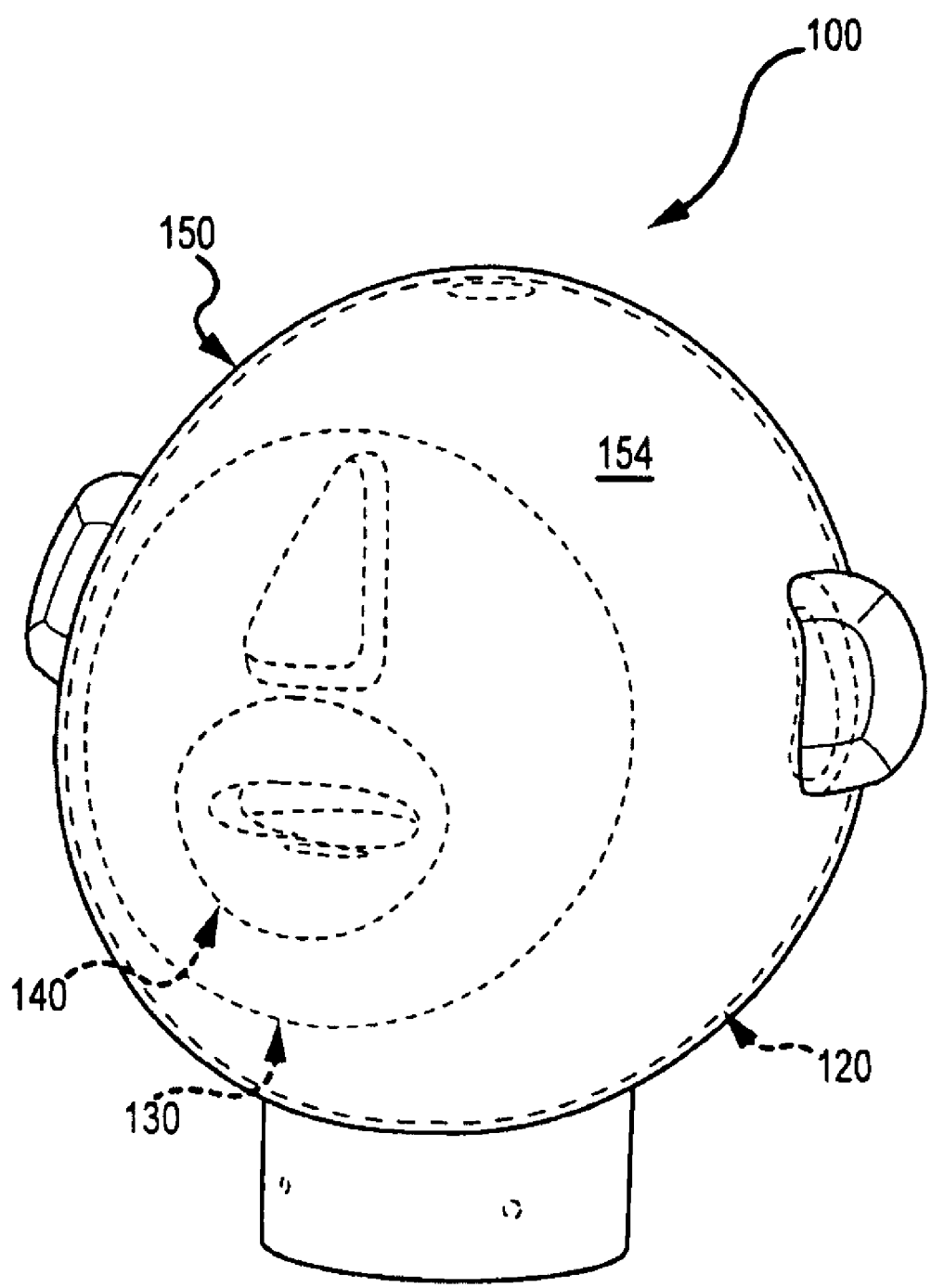
FIG. 4 is a perspective view of the robot assembly of FIG. 3 after application of the exterior component or layer of the skin system.
Figure 5:
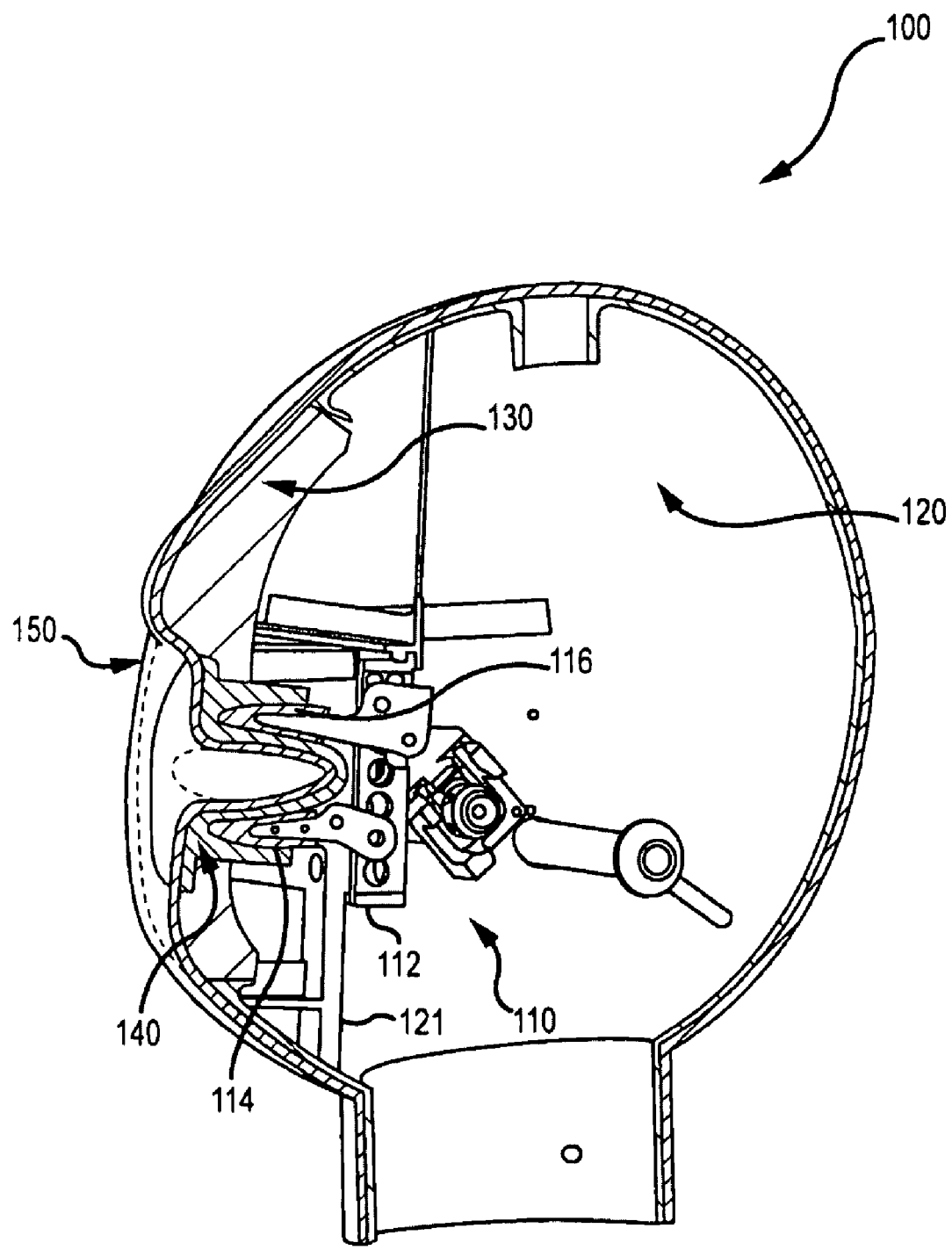
FIG. 5 illustrates the head of FIG. 1 with a cross sectional view showing the various layers of the skin system after assembly (e.g., after the robotics are inserted into the inner shell or frame with the manipulators or drive elements of a mouth mechanism or robotics assembly inserted into the force transfer component or layer of the skin system)

FIG. 4 illustrates a next step in the assembly process in which the robot head 100 is nearly complete. After forming the assembly 300, the bonded assembly 300 is inserted into a mold fabricated for the head 100 and creating the exterior layer 150 of skin assembly 105 is performed. The components 120, 130, 140 are created with dimensions slightly smaller than the adjacent surfaces of the mold such that when the assembly 300 is positioned (e.g., by mounting with the block 310) in the mold there is a gap all the way around the assembly 300 for the exterior skin pour (e.g., liquid silicone or other elastomer or elastic material with a desired hardness when cured or solidified), with the "gap" defining the thickness of the component 150. By pouring the exterior component over the bonded components 120, 130, 140 of assembly 300, the exterior layer or skin component 150 becomes bonded to the skin components 130, 140 to form an integral or unitary skin assembly 105 that moves together when manipulated by robotics 110. Particularly, the inner surface 158 of exterior component 150 is bonded to the outer or facing surface 132 of the backing component 130 and to the outer portion 142 of the robotics insertion component 140.

FIG. 5 illustrates the assembled robot head 100 after the pouring or formation of exterior layer 150 and insertion of robotics 110. As shown, the exterior layer 150 abuts and is bonded to the soft flexible backing component 130 as well as the flexible mechanism insertion component 140. The backing component 130 may be supported by a portion of the shell 120 as shown in this example but this is not required to practice the invention. The robotics 110 are mounted via mounting element 112 to hard shell 120 on frame 121. In this position, the manipulators 114, 116 are inserted into the component 140 of the skin system 105 such that the component 140 moves with the manipulators 114, 116, and such movement is transferred to the attached backing component 130 as well as the overlying and attached flexible exterior component 150. Again, the hardness ratings or values of the three components 130, 140, and 150 are selected to achieve a desired effect for a particular implementation of the head 100. This may involve an amount of testing and modeling to achieve a preferred result, but typically the backing component 130 has the lowest hardness followed by the durable exterior component 150 and then the mechanism insertion or force receiving/transmitting component 140, which is the hardest component in the skin system 105.

Figure 6:
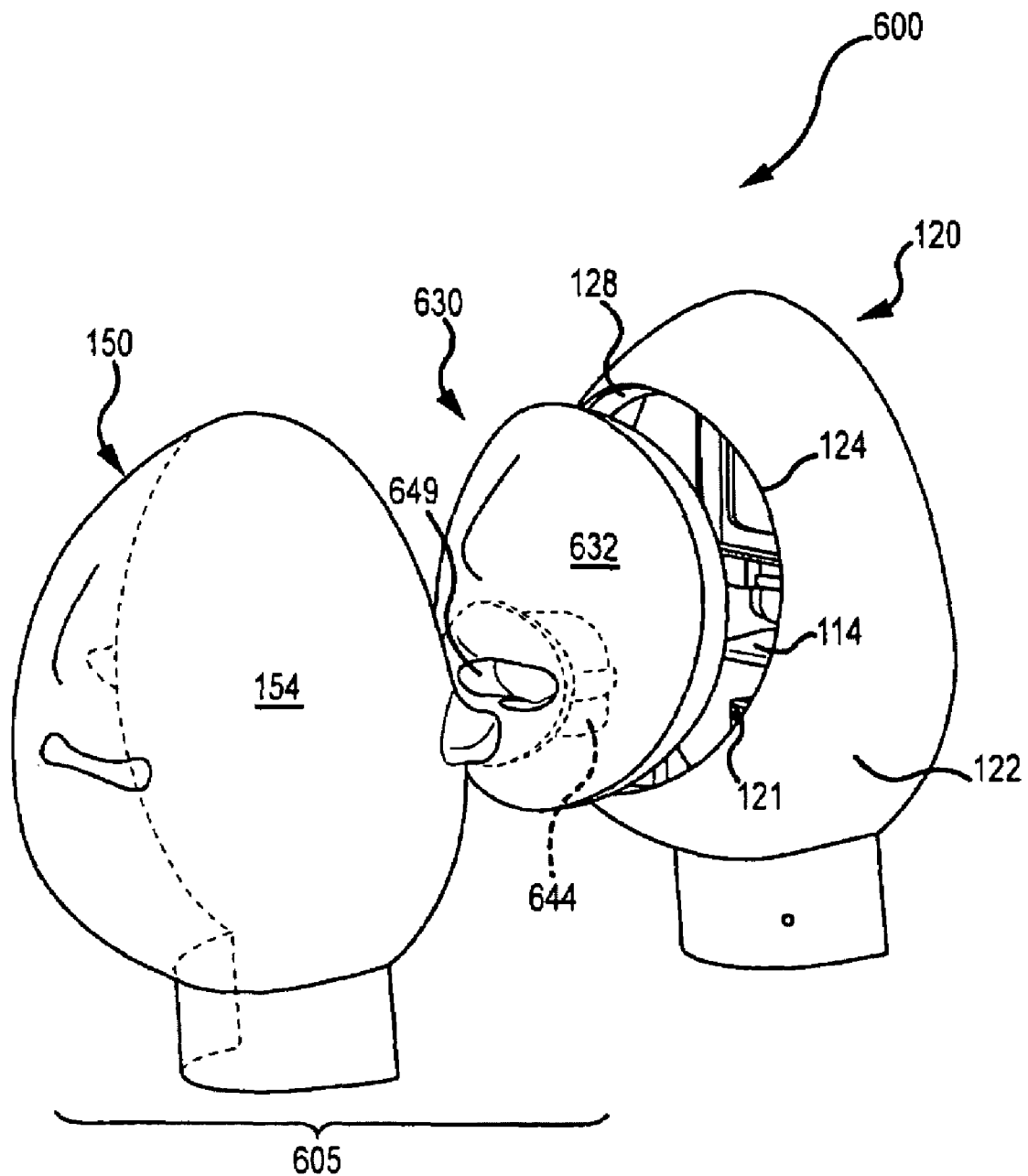
FIG. 6 an exploded view similar to that of FIG. 2 illustrating a robot head including a skin system of another embodiment of the invention showing use of two components with differing hardness rather than three components (e.g., showing that the number of flexible components in a skin system can vary to practice the invention).

As noted, skin systems of the invention include two or more components that are typically flexible and that have different hardness. FIGS. 1-5 illustrate a skin system 105 used in a robot head 100 that include 3 such elastic components. FIG. 6 is provided to show one example of a skin system with a different number of components. As shown, a robot head 600 is shown that includes some similar parts as the head 100 such as a rigid shell 120 and an exterior layer or component 150 that may be poured over the other components to create a bond with at least the other skin components. In this embodiment 600, a skin system 605 is provided that includes the exterior layer or component 150 attached to an inner backing component 630. The inner backing component 630 is attached to the shell 120 such as to sidewall 122 at receiving surface 128 in opening 124 with adhesive. The inner backing component 630 includes an outer or facing surface 632 that is bound to the inner surface of the exterior component 150, e.g., a physical bond that is created as the poured, liquid material of the component 150 cures/hardens.

The inner backing component 630 includes a receiving section or portion 644 for receiving manipulators 114, 116 of robotics and gap or opening 649 for mating with a similar feature in exterior surface 154 of component 150 (e.g., the mouth of the face of head 600). In contrast to system 105, the receiving section 644 and opening or recessed surface 649 are formed integrally with surface 632 such as during the fabrication (e.g., molding) of backing component 630. The backing component 630 including the portion 644 have a single hardness that may be greater or less than the hardness of the exterior layer 150, and, in one embodiment, a compromise is made compared to system 105 with the component 630 being harder than the soft backing 130 but softer than the receiving component 140 of system 105. This may result in the component 630 being somewhat harder than the exterior layer 150 to provide more durability and to effectively transfer forces/movement of robotics 110.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure with materials having two or more hardnesses or differing flexibility and/or durability. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

We claim:

1. An artificial skin system with a movable manipulator mechanism, comprising:

a force receiving component with a receiver contacting the manipulator mechanism, the force receiving component having a first hardness; and an exterior skin component extending over the force receiving component and having an inner surface bonded to the force receiving component, wherein the exterior skin component moves with the force receiving component when the manipulator mechanism applies a force to the receiver, wherein the exterior skin component has a second hardness that differs from the first hardness, and wherein the first hardness is greater than the second hardness.

2. The skin system of claim 1, wherein the force receiving component comprises a first elastic material, the exterior skin component comprises a second elastic material, and the movable manipulator mechanism is a component of a robotic assembly.

3. The skin system of claim 2, wherein the first and second elastic materials are an elastomer.

4. The skin system of claim 3, wherein the elastomer comprises silicone and the inner surface is destructively bonded to the force receiving component.

5. The skin system of claim 1, wherein the first hardness is selected to have a value of less than about 60 as measured on a "00" scale by a durometer and the second hardness is selected to have a value of less than about 50 on the "00" scale.

6. The skin system of claim 1, further comprising an elastic backing component positioned adjacent to the force receiving component to transfer force from the force applied to the force receiving component by a robotic assembly to the inner surface, wherein the elastic backing component is bonded to the inner surface of the exterior skin component and has a third hardness that is less than first and second hardnesses.

7. The skin system of claim 6, wherein the elastic backing component is bonded to the force receiving component with a layer of adhesive and wherein the exterior skin component is fabricated by pouring a fluid elastomer over the elastic backing component and the force receiving component, whereby the inner surface of the exterior skin components integrally bonded to the elastic backing component and the force receiving component as the fluid elastomer solidifies.

8. The skin system of claim 6, further comprising a rigid shell for housing the manipulator mechanism of the robotic assembly and supporting the elastic backing component, wherein the exterior skin component extends at least partically over the rigid shell.

9. The skin system of claim 6, wherein the force receiving component extends through the elastic backing component.

10. The skin system of claim 9, wherein the elastic backing component is bonded to a sidewall extending about the circumference of the elastic backing component.

11. A skin system with elastic components for use with robotics, comprising:
a force receiving and transmitting component with a receiver portion configured for contacting a robotic assembly to receive skin manipulating forces;
a backing component with a gap for receiving the force receiving and transmitting component, whereby the backing component surrounds a periphery of the force receiving and transmitting component; and
an exterior component bonded via an inner surface to both the force receiving and transmitting component and the backing component, wherein the force receiving and transmitting component is formed from a material with a first hardness, the backing component is formed from a material with a second hardness less than the first hardness, and the exterior component is formed from a material with a third hardness less than the first hardness.

12. The skin system of claim 11, wherein the second hardness is less than the third hardness.

13. The skin system of claim 11, wherein the backing component is bonded to the periphery of the force receiving and transmitting component.

14. The skin system of claim 11, wherein the force receiving and transmitting component comprises receiver portion for receiving manipulators of the robotic assembly and further comprises a front wall with a first surface bonded to the inner surface and a second surface abutting the receiver portion.

15. The skin system of claim 14, wherein the backing component is bonded to a periphery of the front wall.

16. A skin system, comprising:
a force receiving component with a receiver portion configured for contacting a manipulator mechanism;
a backing component with a gap for receiving the force receiving component, wherein the force receiving component extends through the force receiving component; and
an exterior component with an inner surface integrally bonded to a front wall of the force receiving component and to a facing surface of the backing component, wherein the force receiving is formed from an elastic material with a first hardness and wherein the exterior component is formed from an elastic material with a second hardness less than the first hardness.

17. The skin system of claim 16, wherein the backing component is formed of an elastic material with a third hardness differing from the first and second hardnesses.

18. The skin system of claim 17, wherein the third hardness is less than the second hardness and wherein the backing component is integrally bonded to the force receiving component.

19. The skin system of claim 17, wherein portions of the backing component abut the force receiving component and wherein forces applied to the force receiving component are transmitted directly to the inner surface via the front wall interconnection and are transmitted indirectly to the inner surface via movement of the abutting portions of the backing component.

20. The skin system of claim 16, wherein the manipulator mechanisms comprises first and second manipulators, wherein the receiver portion comprises first and second spaced-apart, recessed surfaces for receiving the manipulators, wherein the front wall includes a gap positioned between the recessed surface, and wherein the exterior component extends over and into the gap.

* * * * *